United States Patent [19]

Selbert et al.

[11] Patent Number: 4,740,260

[45] Date of Patent: Apr. 26, 1988

[54] METHOD AND APPARATUS FOR MANUFACTURING SEATS AND ARTICLE FORMED THEREBY

[75] Inventors: Alan J. Selbert, Tecumseh; Duane W. Witzke, Adrian; Randy A. Zeilinger, Ypsilanti, all of Mich.

[73] Assignee: Johnson Service Company, Milwaukee, Wis.

[21] Appl. No.: 897,481

[22] Filed: Aug. 18, 1986

[51] Int. Cl.$^4$ ............................................. B32B 5/18
[52] U.S. Cl. ........................................ 156/213; 5/470; 156/196; 428/71; 428/76
[58] Field of Search ................... 5/470, 471, 481, 490; 53/456, 521, 575, 576; 156/294; 297/452, DIG. 1; 428/71, 76

[56] References Cited

U.S. PATENT DOCUMENTS

| | | | |
|---|---|---|---|
| 1,156,939 | 10/1915 | Smith | 297/DIG. 1 |
| 3,318,636 | 5/1967 | Callum | 428/160 X |
| 3,361,610 | 1/1968 | Hannes | 428/187 X |
| 3,389,411 | 6/1968 | Emery | 428/76 X |
| 4,493,877 | 1/1985 | Burnett | 428/542.8 |
| 4,537,646 | 8/1985 | Hoyle | 428/12 X |
| 4,557,790 | 12/1985 | Wisbey | 156/196 X |
| 4,579,764 | 4/1986 | Peoples, Jr. et al. | 428/95 |
| 4,592,345 | 6/1986 | Wahl | 297/452 X |

Primary Examiner—Henry F. Epstein
Attorney, Agent, or Firm—Harness, Dickey & Pierce

[57] ABSTRACT

The method and apparatus for forming at least a portion of a seat wherein an envelope cover comprising a generally tubular shape fabric member having an open end and inner and outer sides is positioned on a cantilever supported forming tool so as to shape at least a portion of the outer side to a desired shape. A foam pad which has been molded to a shape conforming to the predetermined shape of the cover is then positioned in firm surface-to-surface engagement with the shaped cover portion and secured by glue thereto. The envelope can then be removed from the cantilever supported forming tool with the foamed pad adhered thereto and then turned inside out and assembled with a seat frame to provide a desired portion of a seat. This eliminates the need for fasteners or hard plastic back panels in the seat portion.

1 Claim, 2 Drawing Sheets 4,740,260

1

METHOD AND APPARATUS FOR MANUFACTURING SEATS AND ARTICLE FORMED THEREBY

BACKGROUND OF THE INVENTION

This invention relates generally to the field of seating and more particularly to the field of vehicle seating wherein seat constructions are required which can be manufactured in large quantities at low cost and with a broad range of styling possibilities. The field of this invention relates generally to the field of the invention disclosed in co-pending application Ser. No. 819,774, filed Jan. 16, 1986, assigned to the assignee of this application.

The principal object of this invention is to provide cantilevered tool apparatus which enables the construction of trim covers that have soft back panels thereby eliminating the need for hard plastic back panels, zippers or other fastener/attachments that are cost-incurring items in a trim cover, such as a cover for a vehicle seat back. It is also an object of this invention to provide a vehicle seat back constructions which makes use of lay-on type foam pads that are secured by an adhesive to the cover thereby avoiding the necessity for encapsulation of a foam body on the frame. The product of this invention enables lower overall production costs as well as a faster production process.

Because the envelope cover is an integral assembly with a foam pad of the desired configuration enclosed therein, the product lends itself to a broader range of styling possibilities which is an obvious advantage in a field such as the field of automobile seating.

SUMMARY OF THE INVENTION

The article of this invention consists of an envelope cover assembly comprising a generally tubular shaped member having an open end, a closed end, an inner side and an outer side. At least a portion of the outer side is conformed to a predetermined shape, such as by the process disclosed in the above reference co-pending application, and a shaped foam pad having a surface corresponding in shape to the predetermined shape to which a portion of the cover has been formed is then secured by suitable adhesive to the inner side of the envelope at a position opposite the portion of the outer side that is of the same predetermined shape. The envelope is then turned inside out so as to enclose the foam pad and enable the cover to be telescoped over a supporting frame.

Production of the article is enabled by the provision of apparatus which includes a forming tool that is cantilever supported to enable the cover to be telescoped open end first over the free end of the forming tool. The forming tool is then used to shape the cover, following which the shaped foam pad is moved into engagement with the shaped cover and adhered by glue. The envelope with the pad adhered to it can then be readily moved lengthwise off the cantilever supported tool. Turning of the cover inside out then enables assembly of the envelope with a supporting frame, with the shaped front of the cover on the outside and the foam pad inside the envelope.

By virtue of the cantilever tool design and the pad and envelope cover assembly, the process of this invention can readily be repeated with the quality assurance necessary in high production industries.

2

BRIEF DESCRIPTION OF THE DRAWINGS

Further objects, features and advantages of the invention will become apparent from a consideration of the following description and the appended claims when taken in connection with the accompanying drawing in which:

Figure 1:
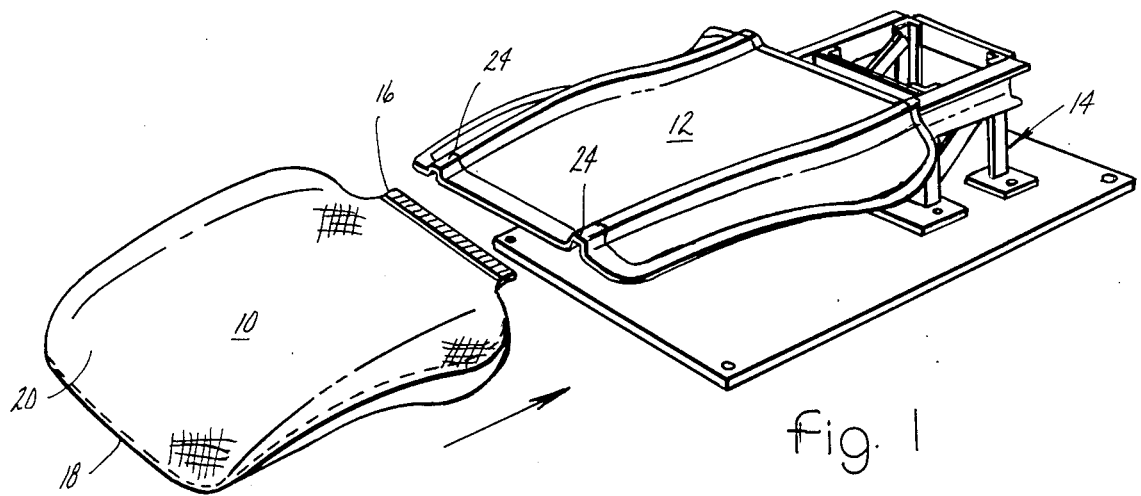
FIG. 1 is a perspective view of the cantilever forming tool apparatus of this invention illustrating an envelope cover being mounted on the forming tool.

With reference to the drawing, the envelope cover member of this invention, indicated generally at 10, is illustrated in FIG. 1 in a position in which it is about to be supported on a shaped forming tool member 12 that is cantilever supported on a support structure 14. The envelope cover member 10 is of generally tubular shape having an open end 16, a closed end 18, an inner side 20 and an outer side 22 shown in FIG. 7. In the position of the envelope cover member 10 shown in FIG. 1, the inner side 20 faces outwardly for a purpose to appear presently.

The forming tool 12 is shaped to provide a desired contour to the inner side of the envelope cover 10 and, accordingly, is illustrated as having a pair of upwardly extending inverted U-shape projections 24 but it is to be understood that the forming tool 12 can be of substantially any shape desired for the seat back.

Figure 2:
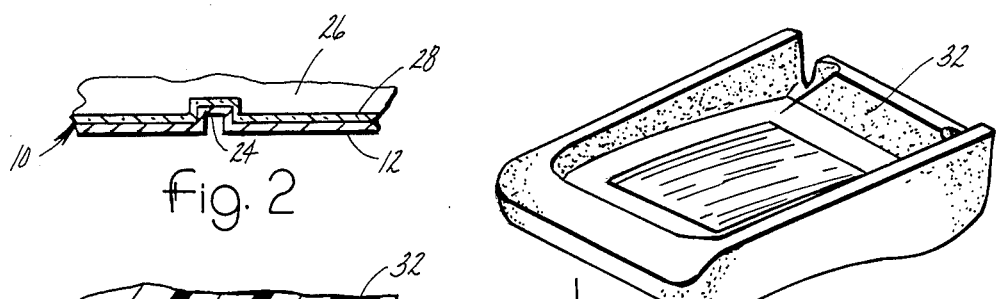
FIG. 2 is a fragmentary detail sectional view showing the envelope cover supported on the forming tool shown in FIG. 1 and with a second forming tool engaging the opposite side of the cover.
Figure 4:
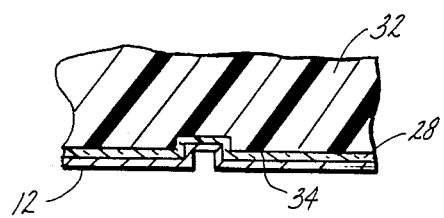
FIG. 4 is a fragmentary detail sectional view showing the first forming tool, the envelope cover and the pad in assembly relation.
Figure 3:
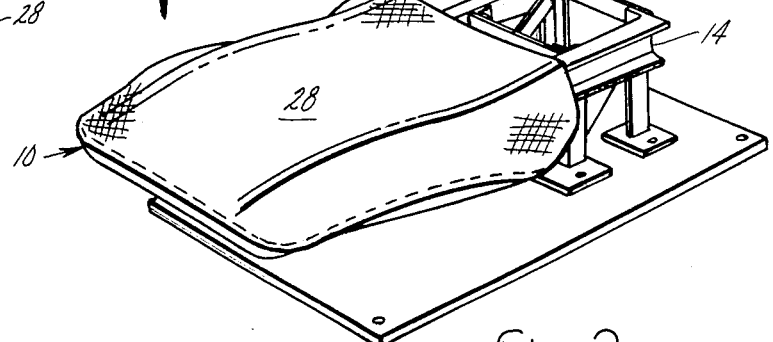
FIG. 3 is a perspective view like FIG. 1 showing the envelope cover mounted on the cantilever forming tool and showing a molded foam pad in position to be adhered to the shaped portion of the cover.
Figure 5:
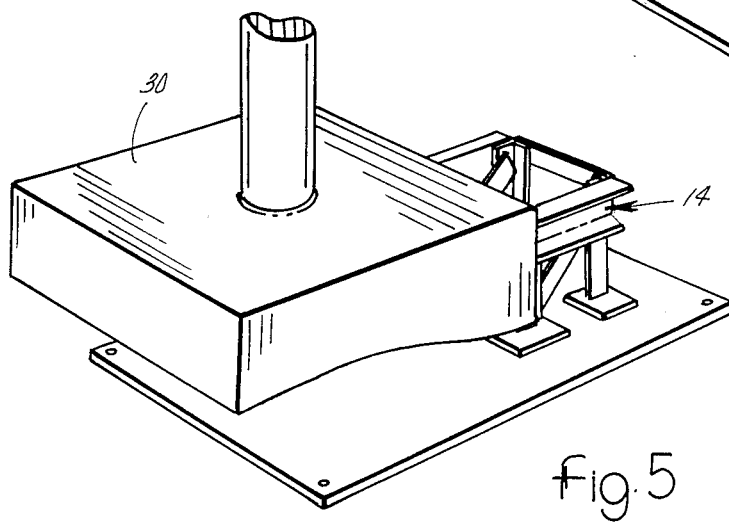
FIG. 5 is a perspective view showing the fixture lowering the pad into position on the envelope cover on the forming tool.

The envelope cover 10 is telescoped, open end 16 first, over the cantilever supported forming tool 12 to a position illustrated in FIG. 3 in which substantially the entire cover member 10 is supported on the forming tool 12 which is entirely cantilever supported on the support structure 14 to enable the cover member 10 to be telescoped thereover. A second forming tool 26 is then lowered onto the envelope cover 10 so as to conform the top or front portion 28 of the cover 10 to the shape of the forming tool 12. As shown in FIG. 2, the forming tools 12 and 26 are of complementary shape so as to sandwich the cover member 10 therebetween and shape the fabric in the envelope cover 10 to the shape of the forming tool 12. Heat and pressure are applied to the tools 12 and 26 to faciliate forming of the fabric in the envelope cover 10 to the desired shape.

A fixture 30 which is eliminated from FIG. 3 for purposes of clarity, is then lowered toward the shaped cover member 10 on the forming tool 12 with a foam pad 32 that has been molded to a desired shape and has been sprayed with an adhesive on its underside 34 facing the envelope cover 10. The side 34 of the pad 32 has a surface that is shaped complementary to the shape of the envelope cover 10 and the forming tool 12 and corresponds to the shape desired for the front side of the seat back.

Figure 6:
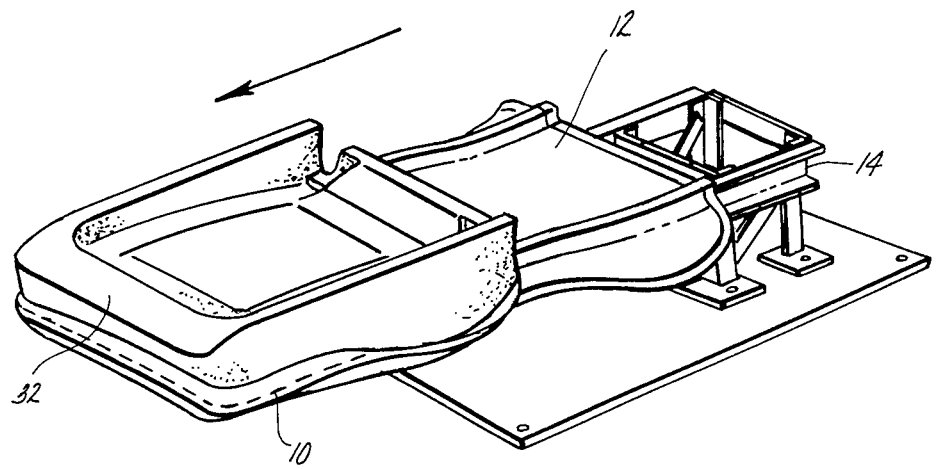
FIG. 6 is a perspective view showing the assembly of the envelope cover and the molded pad being removed from the forming tool.

The fixture 30 is utilized to apply heat and pressure to pad 32 to assure its firm adherence to the inner side 20 of the envelope cover 10, following which the fixture 30 is removed and the assembly, shown in FIG. 6, consisting of the envelope cover 10 and the pad 32 is moved lengthwise off the cantilever end of the forming tool 12.

Figure 7:
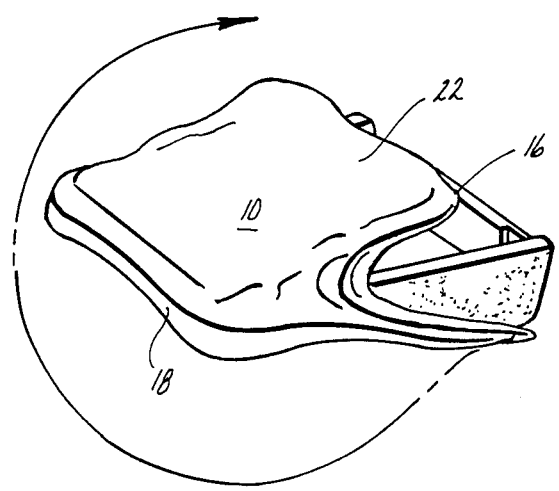
FIG. 7 is a perspective view illustrating the cover being turned inside out so as to enclose the pad.
Figure 8:
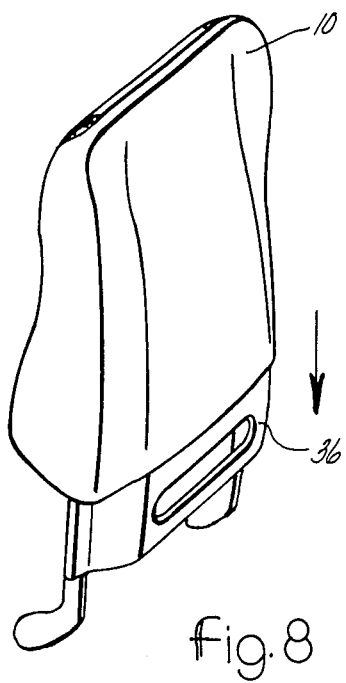
FIG. 8 is a perspective view illustrating the envelope cover and pad assembly being telescoped over a supporting seat back frame.

The foam pad 32 is of a size to be enclosable within the envelope cover 10 and, as a result, the envelope cover 10 can be turned inside out so as to completely enclose the pad 32 therein as shown in FIG. 7. The resulting assembly can then be readily telescoped downwardly over a supporting seat back frame 36 to provide a desired seat back structure in which the foam pad 32 provided with a conforming cloth cover on its front side is positioned on the front side of the frame 36 and the back side of the frame 36 is covered solely by the envelope cover 10 without the requirement of any hard back panels or zippers or other fasteners which complicate the manufacture and assembly of the seat.

Thus, the seat assembly of this invention can be readily manufactured without the requirement for foam encapsulation which increases costs while still lending itself to a broad range of styling possibilities since the construction of the forming tool 12 controls the style that is imparted to the cover 10 and the structure of the forming tool 12 can readily be varied to achieve a desired styling result.

What is claimed is:

1. The method of forming at least a portion of a seat utilizing a molded foam pad having a portion of its surface of predetermined shape, a supporting frame, and an envelope cover member for the pad and frame of generally tubular shape and having an open end and inner and outer sides, comprising the steps of:
   a. turning said cover member inside out so that said inner side is on the outside of said cover member;
   b. shaping at least a portion of said inner side to said predetermined shape;
   c. positioning said foam pad on said envelope cover member so that said portion of the surface of said pad having said predetermined shape is adjacent to said inner side and in complementary relation to the shape of said inner side of said cover member having said predetermined shape;
   d. adhering said portion of said pad to said complementary shaped inner side of said envelope cover member at a position opposite said shaped portion of said outer side; and
   e. manipulating said envelope cover so that said outer side is on the outside of said cover and said pad is enclosed therein and the envelope cover can be telescoped open end first over said supporting frame.

* * * * *